United States Patent Office 2,992,089
Patented July 11, 1961

2,992,089
HERBICIDAL PROCESS
Leonard W. Melander, St. Paul, Minn., and Stanley R. McLane, Prospectville, and Melvin L. Sutherland, Lafayette Hill, Pa., assignors to Amchem Products, Inc., Ambler, Pa., a corporation of Delaware
No Drawing. Filed Feb. 13, 1959, Ser. No. 792,974
6 Claims. (Cl. 71—2.4)

This invention relates to a new herbicidal process. More specifically, it relates to a process for the economic eradication and/or suppression of undesirable plant systems.

It is well known that 3-amino-1,2,4-triazole is a herbicide which can be used successfully to eradicate numerous undesirable plants. However, in order to obtain effective control or kill of certain obnoxious plants, it has been necessary to apply such large amounts of 3-amino-1,2,4-triazole that the control of plants, such as for example quackgrass (*Agropyres repers*) and Bermuda grass (*Cynodon dactylon*) at times becomes uneconomical.

It is further known that the thiocyanate ion, when applied in the form of ammonium, sodium, potassium or lithium thiocyanate, at rates varying between 200 and 1200 lbs./acre can be considered to be a non-selective contact herbicide. Obviously, however, the use of thiocyanate in such large amounts is not economically practical from a commercial viewpoint.

The primary object of the present invention is to provide a new and selective herbicidal process utilizing a combination of 3-amino-1,2,4-triazole and thiocyanate ion which is highly efficient in controlling undesirable perennial grasses.

A further object of this invention is the provision of a new herbicidal composition of the aforesaid type which is economically practical and which can be employed at relatively low rates of application.

The present invention is based upon the discovery that if the thiocyanate ion is applied to plants at a rate between approximately ½ lb./acre and 5 lbs./acre, such plants are rendered highly susceptible to an application of 3-amino-1,2,4-triazole. When the thiocyanate ion is applied at a rate of less than approximately ½ lb./acre, no significant enhancement of result is found for a given rate of application of 3-amino-1,2,4-triazole. At application rates exceeding approximately 12 lbs./acre of thiocyanate ion, the activity of a given rate of application of 3-amino-1,2,4-triazole is no more than normally would have occurred if the 3-amino-1,2,4-triazole had been used alone. For maximum enhancement of the activity of 3-amino-1,2,4-triazole, the rate of application of the thiocyanate ion is in the range of approximately 1 to 4 lbs./acre.

It is to be noted that the percent concentration of the solution or suspension applied to the ground is not important. What is important is the amount of compound applied per acre to the plant or plants growing on the ground. For instance, the concentration of the thiocyanate ion or the 3-amino-1,2,4-triazole may vary from 0.0001% up to saturation of the solution provided the total amount of the compound applied to the plant in the case of the thiocyanate ion is between ½ and 12 lbs./acre and for optimum conditions preferably in the range of 1 to 4 lbs./acre.

Treatments may be made simultaneously in the form of aqueous solutions of a thiocyanate salt selected from the group described above and 3-amino-1,2,4-triazole. As a matter of practicality, the most useful and economical solutions are those containing approximately equal amounts of the aminotriazole and ammonium thiocyanate.

Although the activity of the treatment will vary from species to species even among the stoloniferous plants, it has been observed that quackgrass plots which were not controlled by an application of 3-amino-1,2,4-triazole at 8 lbs./acre were controlled by a treatment of 1 lb./acre of 3-amino-1,2,4-triazole in combination with 3 lbs./acre of a thiocyanate salt.

In order to illustrate the advantages flowing from the present invention, 3-amino-1,2,4-triazole (referred to simply as "3-ATA" in the following tables for the sake of brevity) and ammonium thiocyanate were applied to replicated quackgrass plots by means of a log sprayer. Rates of application of both the 3-amino-1,2,4-triazole and ammonium thiocyanate as well as the degree of control of quackgrass are indicated in Table I below:

TABLE I

Percent quackgrass control with various combinations 3-aminotriazole and $NH_4SCN$

| 3-ATA, lbs./acre | $NH_4SCN$, lbs./acre | | | | | |
|---|---|---|---|---|---|---|
| | 12 | 6 | 3 | 1.5 | 0.75 | 0 |
| 1 | 39 | 40 | 83 | 70 | 48 | 11 |
| 2 | 48 | 54 | 85 | 82 | 36 | 40 |
| 4 | 65 | 62 | 91 | 89 | 43 | 36 |
| 8 | | | | | | 63 |

At a somewhat more randomized plot, mixtures of 3-amino-1,2,4-triazole and ammonium thiocyanate were applied to replicated Bermuda grass plots in a manner similar to the tests noted above. Rates of application and degree of control are indicated as follows in Table II:

TABLE II

Percent of Bermuda grass control with various combinations of 3-amino-1,2,4-triazole and ammonium thiocyanate

| 3-ATA, lbs./acre | $NH_4SCN$, lbs./acre | | | | | | | |
|---|---|---|---|---|---|---|---|---|
| | 6 | 4 | 3 | 2 | 1½ | 1 | ½ | 0 |
| 2 | | | | | 50 | | 20 | 10 | 0 |
| 4 | | | 50 | | 70 | | 70 | | 10 |
| 6 | | 60 | | 100 | | 80 | | | 50 |

As a further illustration of the unexpected advantages resulting from application of the active herbicidal agents of this invention to stoloniferous plant species, varying rates of 3-amino-1,2,4-triazole and sodium thiocyanate were applied as aqueous solutions to established stands of Chewings fescue and Zoysia grasses. Results of these tests recorded 9 weeks after spraying are summarized in Tables III and IV below.

TABLE III

Percent Chewings fescue control with various combinations of 3-amino-1,2,4-triazole and sodium thiocyanate

| 3-ATA, lbs./acre | NaSCN, lbs./acre | | | | |
|---|---|---|---|---|---|
| | 8.52 | 6.38 | 4.26 | 2.13 | 0 |
| 0 | 0 | 0 | 0 | 0 | 0 |
| 2 | | 100 | 100 | 100 | 20 |

TABLE IV

*Percent Zoysia grass control with various combinations of 3-amino-1,2,4-triazole and sodium thiocyanate*

| 3-ATA, lbs./acre | NaSCN, lbs./acre | | | | |
| --- | --- | --- | --- | --- | --- |
| | 8.52 | 6.38 | 4.26 | 2.13 | 0 |
| 0 | 0 | 0 | 0 | 0 | 0 |
| 2 | | 100 | 100 | 100 | 20 |

Aqueous solutions of 3-amino-1,2,4-triazole and of potassium thiocyanate were sprayed on plots of Seaside bent grass. Rates of application and degree of control are shown in Table V.

TABLE V

*Percent Seaside bent grass control with various combinations of 3-amino-1,2,4-triazole and potassium thiocyanate*

| 3-ATA, lbs./acre | KSCN, lbs./acre | | | |
| --- | --- | --- | --- | --- |
| | 10.2 | 7.64 | 2.54 | 0 |
| 0 | 0 | 0 | 0 | 0 |
| 2 | | 100 | 80 | 10 |

Additional experiments were run wherein various rates of 3-amino-1,2,4-triazole and sodium thiocyanate were applied on stands of mature quackgrass measuring 8–10 inches in height. These chemicals were sprayed as aqueous solutions and the treated plots were plowed two to three weeks following spraying. Observations reported in Table VI were recorded 14 weeks after spray application and show the percent quackgrass control with various combinations of 3-amino-1,2,4-triazole and sodium thiocyanate.

TABLE VI

| 3-ATA, lbs./acre | NaSCN, lbs./acre | | |
| --- | --- | --- | --- |
| | 2.13 | 1.07 | 0 |
| 1 | 85 | 85 | 15 |
| 2 | 95 | 93 | 50 |
| 4 | | 95 | 85 |
| 8 | | | 95 |

Aqueous solutions of aminotriazole and of equal admixtures of aminotriazole and lithium thiocyanate were sprayed on mature 8-inch high quackgrass in 7-inch menne pots. One month after treatment the foliage was removed and three months following spray treatment the regrowth was compared to potted, untreated specimens. Application rates and resulting regrowth observations are reported in Table VII.

TABLE VII

| Active Ingredient | Total Rate, lbs./acre | Regrowth, Percent |
| --- | --- | --- |
| Control | None | 100 |
| 3-ATA | 5 | 55 |
| 2.5 lbs. 3-ATA plus 2.12 lbs. LiSCN | 4.62 | 11 |

What is claimed as the invention is:

1. A method of herbicidally treating plant growth which comprises applying to the plant growth a mixture of 3-amino-1,2,4-triazole and an inorganic salt of thiocyanic acid which yields thiocyanate ions, said salt being applied at a rate of between about ½ and 12 lbs./acre, said 3-amino-1,2,4-triazole being used in an amount sufficient to provide herbicidal action when so applied.

2. The method of claim 1 wherein said salt is applied at a rate of about 1 to 4 lbs./acre.

3. A method of herbicidally treating plant growth which comprises applying to the plant growth a herbicidally effective mixture of 3-amino-1,2,4-triazole and a thiocyanate salt selected from the group consisting of the ammonium, sodium, potassium and lithium salts, said salt being applied in an amount sufficient to provide between about ½ and 12 lbs./acre of thiocyanate ion, said 3-amino-1,2,4-triazole being used in an amount sufficient to provide herbicidal action when so applied.

4. The method of claim 3 wherein said salt is applied in an amount sufficient to provide between about 1 to 4 lbs./acre of thiocyanate ion.

5. The method of claim 3 wherein said 3-amino-1,2,4-triazole and said thiocyanate salt are applied in approximately equal amounts.

6. The method of claim 3 wherein said 3-amino-1,2,4-triazole and said thiocyanate salt are applied in aqueous solution.

References Cited in the file of this patent

UNITED STATES PATENTS

| 1,997,750 | Sauchelli | Apr. 16, 1935 |
| 2,670,282 | Allen | Feb. 23, 1954 |
| 2,709,648 | Ryker et al. | May 31, 1955 |

FOREIGN PATENTS

| 209,681 | Australia | July 31, 1957 |